US 6,549,366 B1

(12) United States Patent
Ichiyama (10) Patent No.: US 6,549,366 B1
(45) Date of Patent: Apr. 15, 2003

(54) ROTATION-STABILIZING AMBIENT GASEOUS FLUID GUIDE FOR ROTARY AND STORAGE DEVICES

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 112 days.

(21) Appl. No.: 09/656,739

(22) Filed: Sep. 7, 2000

(30) Foreign Application Priority Data

Sep. 8, 1999 (JP) .......................................... 11-254120

(51) Int. Cl.$^7$ .......................... G11B 17/02; G11B 33/00
(52) U.S. Cl. .................................. 360/97.03; 360/98.07
(58) Field of Search .......................... 360/97.01–98.01, 360/98.07, 99.08

(56) References Cited

U.S. PATENT DOCUMENTS

| | | | | |
|---|---|---|---|---|
| 4,821,130 A | * | 4/1989 | Bernett et al. | 360/98.07 |
| 5,031,059 A | * | 7/1991 | Yamaguchi et al. | 360/97.03 |
| 5,430,590 A | * | 7/1995 | Ainslie et al. | 360/98.07 |
| 5,457,588 A | * | 10/1995 | Hattori et al. | 360/99.08 |
| 5,504,637 A | * | 4/1996 | Asada et al. | 360/98.07 |
| 5,541,791 A | * | 7/1996 | Yamasaki et al. | 360/97.02 |
| 5,696,649 A | * | 12/1997 | Boutaghou | 360/97.03 |
| 5,909,339 A | * | 6/1999 | Hong | 310/90 |
| 6,236,532 B1 | * | 5/2001 | Yanagisawa | 360/97.02 |

FOREIGN PATENT DOCUMENTS

| | | |
|---|---|---|
| JP | 6-43382 | 2/1994 |
| JP | 6-294937 | 10/1994 |
| JP | 7-14360 | * 1/1995 |
| JP | 8-237903 | 9/1996 |
| JP | 9-285094 | 10/1997 |
| JP | 10-205538 | 8/1998 |
| JP | 11-55918 | 2/1999 |

* cited by examiner

*Primary Examiner*—Jefferson Evans
(74) *Attorney, Agent, or Firm*—James Judge (57) ABSTRACT

Air guides provided in a dynamic-pressure-bearing motor on a rotor-surrounding wall of the motor casing. The air guides project radially from the casing wall and have an axially extending guide surface that concentrates air, made to flow by rotation of the rotor, radially inward toward a predetermined position along the rotor with respect to its cylindrical surface, to apply radially directed pressure against the rotor. If the motor is for a disk drive, the rotor may carry a number of storage disks and the air guides may be disposed proximate at least one of the axial upper/lower surfaces among those of all or a portion of the storage disks. The pressure developed by the air guides maintains the spinning rotor in an eccentric state, which works to resist the wobbling due to half-speed whirling and improve the motor's rotational precision.

22 Claims, 4 Drawing Sheets

ROTATION-STABILIZING AMBIENT GASEOUS FLUID GUIDE FOR ROTARY AND STORAGE DEVICES

BACKGROUND OF THE INVENTION

1. Technical Field

The present invention relates to rotary and storage devices provided with radial dynamic-pressure bearings. In particular it relates to radial-dynamic-pressure-bearing equipped rotary and storage devices having compensatory means to prevent unstable rotation such as wobbling from developing in the rotor.

2. Description of Related Art

Programs and data for personal computers generally are stored in storage-disk rotary-type storage devices such as hard-disk drives. Various storage media—the magnetic disks that are hard disks, CD-ROMs, or optical disks such as DVDs—are employed in the storage devices according to content of the programs or data stored, storage volume and preference conditions of how used.

In recent years, due to the increasing tendency towards complexity and sophistication in programs and data as noted above, storage device improvements in storage volume and performance, such as in running speed, have been striven for. This has placed demands that are becoming more and more stringent on the rotary devices (e.g. spindle motors) that spin recording disks for, in addition to higher speed, rotational precision improvements from wobbling.

Some such storage devices employ spindle motors that are provided with bearing means such as radial hydrodynamic-pressure bearing structures in which either the motor shaft or a sleeve element by which it is surrounded at a gap rotatively supports the other. Half-speed whirl occurring in the bearing region, which causes non-repetitive (non-repeatable) runout—also known as asynchronous error motion—may impede the rotational precision of these spindle motors.

Half-speed whirl is a phenomenon that arises in bearing means in which the shaft component and the sleeve component of radial dynamic-pressure bearings are rotatively supported mutually out of contact. To illustrate by the example of shaft-rotating type spindle motors in which the shaft component spins: Half-speed whirl is phenomenon of the shaft component in an unstable wobbling rotational state due to being shaken by the lubricating fluid, which revolves at half the speed of the rotational speed of the shaft component.

In order to prevent such wobble in radial dynamic-pressure bearings, the technique of making the sleeve component or the shaft component that constitute the radial dynamic-pressure bearing structure not a true circle in cross-sectional form has been proposed. For example, Japanese Laid-Open Pat. Pub. No. 10-205538 proposes a configuration wherein a slit is formed on the inner peripheral surface of the sleeve component. Nevertheless, this technique brings with it difficulties in production of the sleeve component or the shaft component.

A different technique is also known from Japanese Laid-Open Pat. Pub. No. 11-55918 for example, which sets forth a technique in which local magnetic imbalance is set up in the stator opposing the rotor magnet of a spindle motor that is provided with radial dynamic-pressure bearings. This technique prevents sleeve-component wobble by maintaining a constant off-center state in which the sleeve component, rotatively supported by the radial dynamic-pressure bearings, is magnetically attracted in a predetermined diametrical direction to displace the rotational center of the sleeve component from the rotational center of the shaft component. Nevertheless, insofar as this technique is concerned, not only are difficulties in production of the sleeve element involved, but the local magnetic imbalance in the stator risks furthering electromagnetic fluctuation during rotation.

Still another technique is known from Japanese Laid-Open Pat. Pub. No. 6-43382 for example, which sets forth a technique in which the rotary member, which may be the shaft or sleeve, rotates while being pushed in a predetermined diametrical direction by fluid pressure from a pressure distribution varying means, furnished in the sleeve component or base components to alter pressure distribution in the fluid surrounding the rotary member. Nevertheless, this technique involves difficulties in production of the pressure variable-distribution means, and otherwise brings with it difficulties in setting aside space in which the means is disposed.

The above-described problems in rotary devices provided with radial dynamic-pressure bearings also arise with regard to rotary devices provided with radial dynamic-pressure bearings, but other than storage-disk rotary-type storage devices. Polygonal scanner motors installed in laser printers are a case in point. A plurality of mirrored surfaces employed in laser beam scanning that is related to image information is provided on the rotor in polygonal scanner motors, and in some instances radial dynamic-pressure bearings are provided in the bearing means. The fact that radial dynamic-pressure bearings are provided in polygonal scanner motors leads to the possibility of unstable rotatory states such as wobbling in the rotor, likewise as in the storage devices described above, and the rotatory states as such will affect printing precision. For that reason, there likewise exist demands calling for improvements in rotational precision in polygonal scanner motors by preventing asynchronous runout and synchronous runout due to wobbling.

Japanese Laid-Open Pat. Pub. No. 6-294937 for example proposes to diminish non-repeating deflection errors in the rotation of a rotary polyhedral mirror spun by a motor in the base of cylindrical bracket that houses the mirror. The lateral spacing between the cylindrical bracket and the polyhedral mirror is made non-uniform either by establishing an offset between the centers of the bracket and the mirror, or by forming the inner circumferential wall of the bracket with diametrically opposed convex and concave conformations. Thus a maximum gap differential is set up along the line of maximum eccentricity between the two centers, or along the line where the convex and concave conformations are diametrically opposed. The gap differential generates a difference in air pressure surrounding the polyhedral mirror when it spins, such that lateral pressure acts on the mirror in the position along the inner circumferential wall of the bracket where the gap is narrowest.

Of course, in rotary devices provided with radial dynamic-pressure bearings the above-described problems arise not only in particular in spindle motors and polygon scanner motors for storage devices, but also occur in other rotary devices equipped with radial dynamic pressure bearings. Therein demands calling for improvements in rotational precision likewise exist.

SUMMARY OF THE INVENTION

An object of the present invention is in providing rotary devices and storage devices, furnished with radial dynamic-pressure bearings, that are designed for improvement in rotational precision.

Another object of the present invention is to provide rotary devices and storage devices, furnished with radial dynamic-pressure bearings, that realize rotational precision without attendant manufacturing difficulties.

Another object of the present invention is to provide rotary devices and storage devices, furnished with radial dynamic-pressure bearings, that realize rotational precision without attendant promotion of electromagnetic fluctuations.

Yet another object of the present invention is to provide rotary devices and storage devices, furnished with radial dynamic-pressure bearings, that realize rotational precision without bringing on difficulties in component arrangement.

Still another object of the present invention is in providing rotary devices and storage devices, furnished with radial dynamic-pressure bearings, that prevent the harm of damage to the radial dynamic-pressure bearings owing to the rotational center of the rotor being overly de-centered.

Another object of the present invention is in providing storage devices that heighten read/write accuracy with respect to recording media.

Another object of the present invention is in providing storage devices that heighten read/write accuracy with respect to recording media without hindering the read/write operation of the read/write head.

According to a rotary device of the present invention, furnished with radial dynamic-pressure bearings, the rotor is rotatively supported against a stationary member via bearing means including a radial dynamic-pressure bearing. The rotor has a rotary main having an outer peripheral surface section, and one or more flat plate-shaped members projecting diametrically outward from the outer peripheral surface section, coaxially with the rotary main. The stationary member is provided with a fluid guide member proximate to at least one face of axially upper and lower surfaces respectively in all or a part of the flat plate-shaped members.

Fluid, such as air, present over the recording medium rotates with the rotation of the recording medium and is guided heading diametrically inward to a predetermined position on the outer peripheral surface section by the fluid guide member(s), and pressure is gained in a predetermined diametrical direction with respect to the rotor. Because this pressure maintains the rotor in an eccentrically urged state, the above-described rotary device suppresses wobbling action due to half-speed whirling, which works toward improving rotational precision.

Further, according to a storage device of the present invention, the rotor is rotatively supported against a stationary section via radial dynamic-pressure bearings. The rotor has a rotary main having an outer peripheral surface section and a flat plate-shaped recording medium installed on the rotary main, with the medium projecting diametrically outward from the outer peripheral surface section, coaxially with the rotary main. The stationary section has a fluid guide member proximate to all or a part of at least one of axially upper and lower surfaces of the recording medium, and a read/write head that performs reading/writing of data on the recording medium. Fluid, such as air, present over the recording medium rotates with the rotation of the recording medium and is guided heading diametrically inward to a predetermined position on the outer peripheral surface section by the fluid guide member, and pressure is gained in a predetermined diametrical direction with respect to the rotor. Because this pressure maintains the rotor in an eccentrically urged state, the foregoing storage device suppresses wobbling action due to half-speed whirling, which works toward improving rotational precision. The fluid guide member is located so as not to disturb the operation of the read/write head on the head mechanism, and desirably is disposed in a diametrically opposite position from the head with respect to the rotor body. Therefore, because the recording medium does not develop unstable rotation such as wobbling, rotational precision is heightened.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

A hard disk drive device ("HDD" hereinafter) as an embodiment of the present invention will be explained with reference to the drawings.

Figure 1:
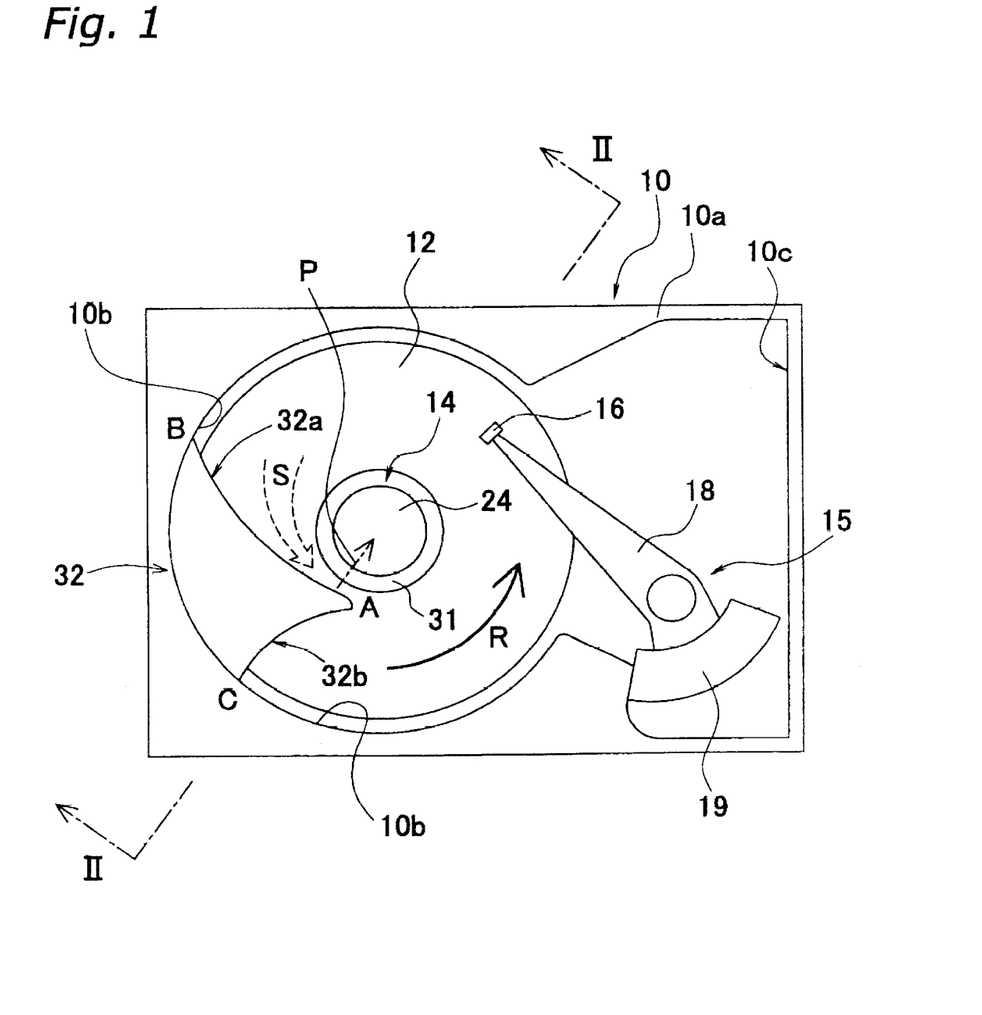
FIG. 1 is a plan view showing a state in which the top plate has been taken off in a storage device illustrating an embodiment of the present invention.

In the HDD shown in FIG. 1 is a spindle motor 14 on which hard disks ("disks" hereinafter) 12 as a recording medium are installed. A head mechanism 15 is furnished with a magnetic head 16 as a read/write means for reading/writing data on the disk 12. A control circuit (not shown) controls the spindle motor 14 and the head mechanism 15. The spindle motor, disks, head mechanism and control circuit are arranged within a casing 10, which is a rectangular parallelepiped in outer shape.

Figure 2:
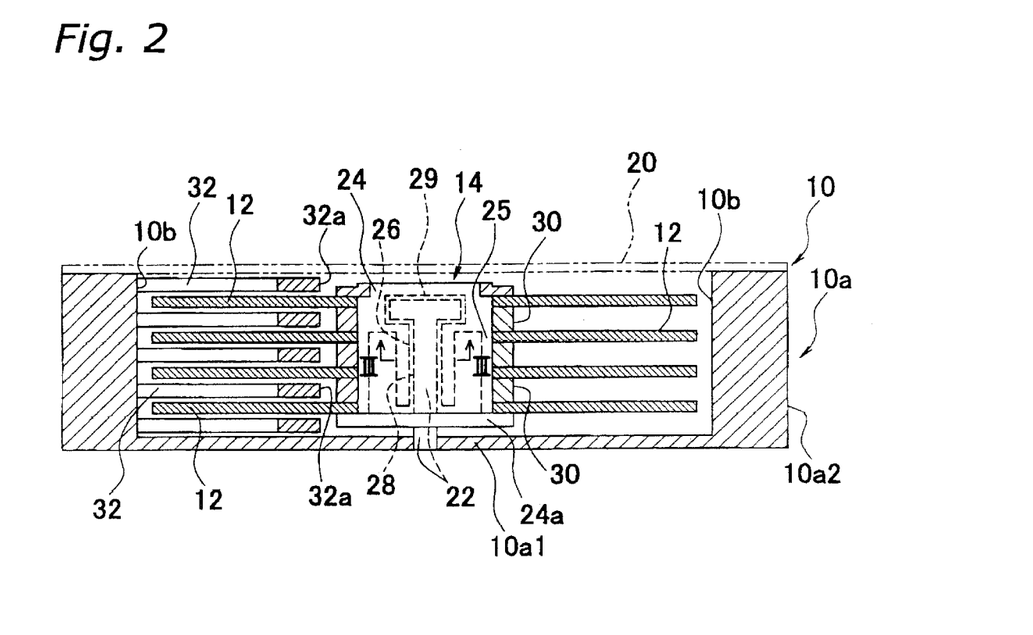
FIG. 2 is a sectional view taken along the line II—II in FIG. 1.

With reference to FIG. 2 as well, the casing 10 is made up of a boxy casing body 10a the upper end of which is open, and a top plate 20 that closes off the opening. The casing body 10a is made up of a rectangular bottom wall 10a1 and lateral side walls 10a2 consisting of four flanks. The inner surfaces of the lateral walls 10a2 of the casing body 10a are made up of cylindrical faces 10b formed to conform with the shape of the disks 12 loaded on the spindle motor 14 so as to encompass the circumference of the disks 12; and approximately rectangular faces 10c ranging to a portion of the cylindrical faces 10b, for arranging the head mechanism 15 and the control circuit. The casing 10 interior is an airtight clean space in which air is present, but so that air pressure difference inside/outside the casing 10 will not occur, it is an airtight space, moreover, that is substantially sealed—that ventilates air to an extent that does not infringe its cleanliness.

In the spindle motor 14 a hub 24 on which the disks 12 are loaded is rotatively supported via a bearing means against a stationary shaft 22 the lower end of which is fixed into the bottom wall 10a1. The stationary shaft 22 is made up of a round cylindrical portion mortised into the bottom wall 10a1, and a disk-shaped thrust plate portion that widens diametrically on the upper end of the round cylindrical portion. The hub 24 is made up of: a cup-shaped cylindrical member 25 on the outer surface of which the disks 12 are loaded, and on the inner surface of which is a cylindrical permanent magnet (not illustrated); and, on the inner side of the cylindrical section 25, a rotary sleeve member 26 opposing the stationary shaft via a micro-gap.

The bearing means is made up principally of: a radial dynamic-pressure bearing section 28 in which lubricating oil is sustained in a micro-gap formed between the rotary sleeve member 26 and the round cylindrical portion of the stationary shaft 22, non-contactually supporting the diametrical load of the hub 24; and a thrust dynamic-pressure bearing section 29 via lubricating oil in a micro-gap formed between the rotary sleeve member 26 and the thrust plate portion, non-contactually supporting the axial load of the hub 24. That is, the spindle motor 14 is a rotary device furnished with a radial dynamic-pressure bearing section 28.

Further, a stator (not illustrated) having coils wound around an iron core, is arranged on the stationary shaft 22, in a location opposing the permanent magnets on the hub 24. Torque is generated in the stator when the magnetic field that arises from passing electricity into the coils acts magnetically on the permanent magnet, which rotates the hub 24 in the direction of arrow R in FIG. 3. It should be understood that the lubricating fluid in the bearing means might be air instead of oil. The thrust bearing section 29 of the bearing means may be other bearing means such as magnetic bearings that employ magnetic repulsion in order to support axial load.

Four disks 12 are fit over the hub 24, and are each fixedly maintained coaxial with the hub 24; the number of disks is not limited to this however. The lowermost disk 12 is loaded onto a brim-shaped portion 24a projecting from the lower end outer periphery of the round cylindrical portion of the hub 24, and disks 12 are layered above this disk 12, one after the other by turns via annular spacers 30. An annular damper 31 that is fixed to the hub 24 presses vertically on the uppermost disk 12, fixedly retaining all of the disks 12.

The head mechanism 15 is made up of an access arm 18, the tip of which is furnished with the magnetic head 16, and a support 19 that through a bearing means pivotally supports the access arm 18. Because magnetic heads 16 are required for each of the disks 12 respectively, four of the access arms 18 are arranged.

In response to read/write operation, the magnetic heads 16 are arbitrarily shifted along an arc, centered on the pivotal axis of the support 19, and covering the read/write area that can be read from/written into from the inner periphery of the disks 12 to the outer periphery thereof, and to a retraction area where the magnetic heads 16 are not facing the disks 12.

In the foregoing the casing 10 and the stationary shaft 22 chiefly constitute the stationary sections, and the hub 24, the spacers 30, and the damper 31 chiefly constitute the rotary main members. The disks 12 constitute the flat plate-shaped members, while further the rotor is constituted from these rotary main members and the flat plate-shaped members.

Furthermore, five air-current guide plates 32 as fluid guide members are arranged on the cylindrical faces 10b of the casing 10, facing the disks 12. Since the air-current guide plates 32 are all of like form, particulars of the shape will be explained focussing on the uppermost one set forth in FIG. 1. This air-current guide plate 32 flanks the hub 24 in roughly the opposite side against the magnetic head 16 supported on the access arm 18, and with a predetermined circumferential position A that is proximate the external peripheral surfaces of the clamper 31 as a tip, widens across a certain range rearward (upstream-ward) in the rotational direction of the disks 12 (arrow R).

That is, the air-current guide plate 32 is plate-shaped, substantially parallel with the axially upper and lower faces of the disks 12. Its lateral faces are made up of a rearward face 32a facing rearward with respect to the rotational direction of the disks 12, and a frontward face 32b facing forward. The two lateral faces 32a, 32b are connected in the predetermined position A. The two lateral faces 32a, 32b are planes parallel to the rotational axis of the hub 24 et al., forming planes perpendicular with respect to a plane orthogonal to the rotational axis (for example, the axially upper/lower faces of the disks 12).

Figure 4:
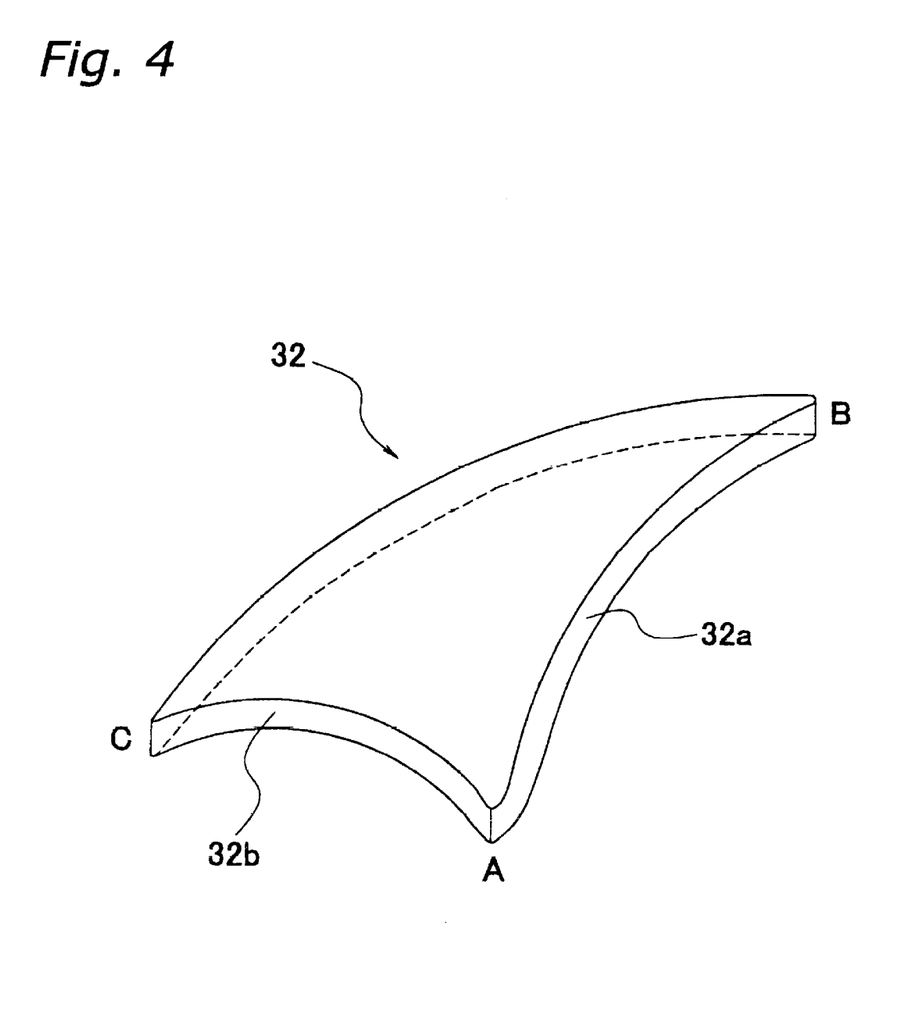
FIG. 4 is an oblique view of an air-current guide plate removed from FIG. 1.

As FIG. 4 illustrates, the rearward lateral face 32a extends from the predetermined position A to a predetermined position B on cylindrical face 10b of the casing 10 that is rearward in the rotational direction of the disks 12, so as to describe an arcuate line that extends forward in the rotational direction of the disks 12, and assume a form that approaches gradually heading from the predetermined position B to the predetermined position A. (The rearward lateral face 32a is equivalent to a guide surface.) Further, the frontward lateral face 32b extends from the predetermined position A to a predetermined position C on cylindrical face 10b of the casing 10 that is rearward in the rotational direction of the disks 12 to some extent from predetermined position A, so as to describe an arcuate line that extends rearward in the rotational direction of the disks 12, and assume a form that approaches gradually heading from the predetermined position C to the predetermined position A.

As far as the other air-current guide plates 32 are concerned, they are of like form as the uppermost air-current guide plate 32; and the lowermost air-current guide plate 32 is proximate the brim-shaped portion 24a of the hub 24, and the intermediate air-current guides 32 are respectively proximate the spacers 30. Also, the predetermined position A as noted above is defined by the magnetic head 16 and the hub 24. The predetermined position B as noted above is defined by the predetermined position A, and is located on the casing 10 rearward in the rotational direction of the disks 12 to a certain extent from the predetermined position A. The predetermined position C is defined by the predetermined position B, and is located on the casing 10 forward in the rotational direction of the disks 12. Therein, the predetermined position C is rearward of the predetermined position A with respect to the rotational direction of the disks 12, but may be forward thereof.

The upper face of the air-current guide plate 32 for the lowermost disk 12 is proximate or adjacent to the lower face of the lowermost disk 12; and its lower face is proximate or adjacent to the upper face of the bottom wall 10a1 of the casing 10. The upper/lower faces of the air-current guide plates 32 between the disks 12 are proximate respectively to the lower face of the disk 12 above, and to the upper face of the disk 12 below. The lower face of the air-current guide plate 32 for the uppermost disk 12 is proximate to the upper face of the uppermost disk 12; and its upper face is proximate to the lower face of the top plate 20. Being that the air-current guide plates 32 all coincide in form and distributional position, only the uppermost air-current guide plate 32 is shown in FIG. 1.

Figure 3:
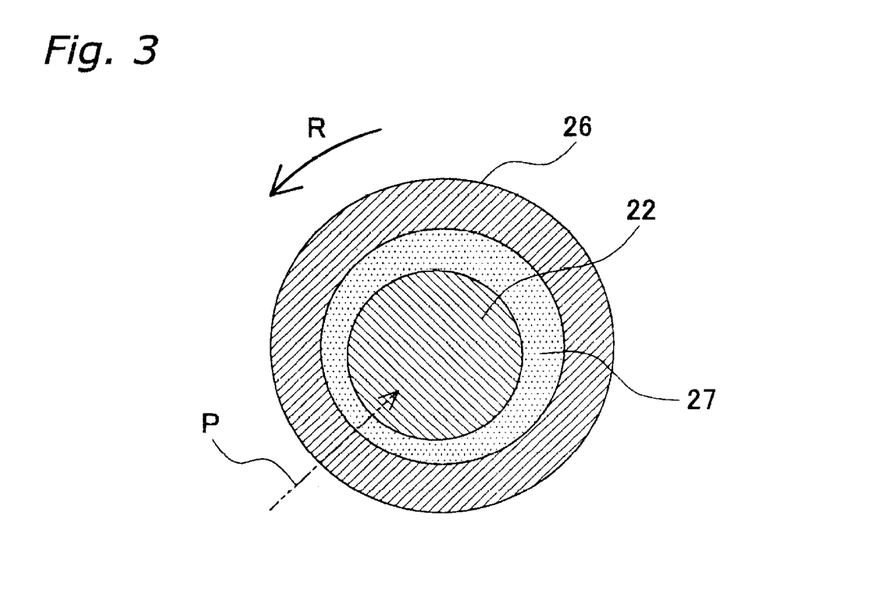
FIG. 3 is a sectional view taken along the line III—III in FIG. 2.

When the disks 12 rotate in the direction of the arrow R by the spinning of the spindle motor 14, air present on the upper/lower faces of each of the disks 12 accompanies the rotation of the disks 12 and travels in the same direction (arrow R).

Most of the travelling air collides with the rearward lateral faces 32a on the air-current guide plates 32 provided proximate the upper/lower faces of the disks 12, is guided diametrically inward as indicated by the arrow S, and gathers in a predetermined position neighboring the outer peripheral surfaces of the damper 31, spacers 30 and brim-shaped or flange portion 24a (on a line that passes through the above-noted predetermined position A, parallel with the rotational axis of the hub 24). In other words, the rearward lateral faces 32a act as guide surfaces that guide air on a line that passes through the above-noted predetermined position A, parallel with the rotational axis of the hub 24 (the rearward lateral faces are called guide faces hereinafter). When air thus guided passes the gap formed by the air-current guide plates 32, and the brim-shaped or flange portion 24a, spacers 30 and damper 31, in the vicinity of that line, the air pressure becomes maximum, gaining pressure in the direction of the arrow P indicated in FIGS. 1 and 3.

For that reason, during rotation of the spindle motor 14, because pressure against the hub 24 is constantly gained in the direction of the arrow P, as shown in FIG. 3 the bearing gap region where the arrow P crosses the radial dynamic-pressure bearing section 28 becomes smaller than the bearing gap in the remaining situation. Namely, an eccentricity is sustained in which the rotational axis of the rotary sleeve member 26 is offset in a constant direction (same direction as indicated by the arrow P) from the center axis of the stationary shaft 22. In a radial dynamic-pressure bearing section 28 thus, pressure that resists shaking action caused by wobble in the rotatively supported rotary sleeve member 26 during rotation is constantly gained in the direction of the arrow P, which therefore prevents asynchronous wobble and synchronous wobble due to half-spaced whirling and heightens rotational precision. Accordingly, lessening discrepancies in position of the magnetic heads 16 with respect to the disks 12 heightens read/write accuracy. It should be understood that the direction of eccentricity of the rotary sleeve member 26, because it is defined by the pressure gained by the air-current guide plates 32 in the orientation of the arrow P, may be freely established by how the predetermined position A on the air-current guide plates 32 is arranged.

Further the position at which the air-current guide plates 32 apply pressure to the hub 24 et al, (position at which the hub 24 et al. are proximate the line parallel with the rotational axis of the hub 24 that passes through the predetermined position A), and the position of the magnetic heads 16 are provided astride the hub 24 so as to be contrariwise, so that air after passing the gap near the predetermined circumferential position A formed by the air-current guide plates 32 does not stream directly into the magnetic heads. Therefore, the read/write operation of the magnetic head 16 is not disturbed or hindered. Of course the air-current guide plates 32 are sufficiently separated from the area through which the access arm 18 containing the magnetic head 16 travels, not to collide with it during the pivoting movement of the access arm 18 and hinder of the read/write operation.

Again, as noted above the form of the guide faces (rearward lateral faces) 32a in the air-current guide plates 32 describes an arcuate line, which lessens air resistance so that air is guided efficiently. Since the frontward lateral faces 32b are, as noted above, of form describing an arcuate line, turbulence due to swirling in of air after passing the gap in the vicinity of the predetermined position A is suppressed. It should be understood that in cases in which the influence of air resistance on the guide faces 32a is slight, the form may describe straight lines instead of the arcuate line. And likewise, in instances wherein the effects of turbulence on the frontward lateral faces 32b are slight, instead of the arcuate line, the form may describe straight lines. Furthermore, the two sets of faces 32a, 32b are surfaces parallel with respect to the rotational axis of the hub 24 et al. and in order to guide air efficiently with little air resistance, they may be surfaces that slant with respect to the rotational axis. The air-current guide plates 32 may be made in any form that guides air to the predetermined position A in the circumferential direction, proximate to the outer peripheral surfaces of the damper 31 et al.

Further, air-current guide plates 32 are provided between the upper/lower surfaces of all of the disks 12, and besides, since all the air-current guide plates 32 coincide in form and distributional position, pressure gathering at the hub 24 et al. is gained nearly uniformly in all axial directions: vibrations in the disks 12 or totter of the rotational axis of the hub 24 due to the action of this pressure during rotation does not occur.

Figure 5:
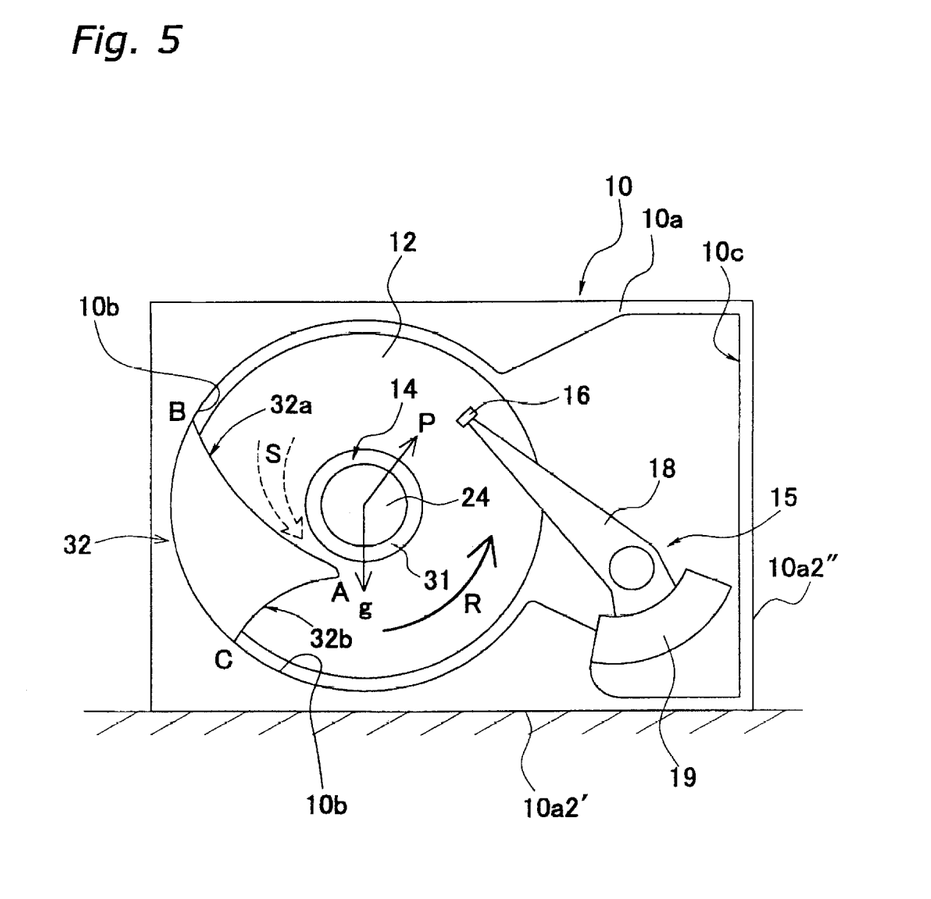
FIG. 5 is a lateral elevational view of the storage device shown in FIG. 1, shown set on its side and again with the top plate taken away for the convenience of illustration.

Still further, when the HDD is set on one of its sides, i.e. on one of the lateral walls 10a2 that compose the four flanks in the casing body 10a, the direction of the rotational axis of the spindle motor becomes horizontal. The rotational center of the hub 24 is made eccentric in this orientation by the action of gravity. If the directions of gravity and of the pressure by the air-current guide plates 32 coincide, the eccentricity of the hub 24 is exaggerated, resulting in damage due to abnormal contact between the shaft and sleeve in the radial dynamic-pressure bearing section. When the HDD housing is set on the lateral wall 10a2' as shown in FIG. 5, the direction of the pressure exerted on the hub 24 by means of the air-current guide plates 32 (arrow P) deviates by about 135 degrees with respect to the gravitational direction, by which extreme biasing (displacement) of the hub is avoided. Accordingly, the air-current guide plates 32 should be located in a position where such extreme biasing is avoided when the HDD casing is set on its side wall in its normal posture. If the casing is set on its shorter side wall 10a2", the angle between the direction of biasing pressure by the air current guide and the gravitational direction is about 45 degrees, such that the combined biasing and gravitational forces result in a large force that may exaggerate the eccentricity. Such being the case, some measure to prevent the HDD housing or casing from being put in this posture may be provided on the wall 10a2", such as a marking or projection.

The foregoing embodiment in the present invention has been explained taking the example of an HDD with four storage disks, but the number of disks and the configuration of the spindle motor are not limited to the described embodiments. Further, the present invention is likewise applicable to storage devices such as optical disk CD-ROMs furnished with radial dynamic-pressure bearings, and other than in storage devices to rotary devices such as polygon scanner motors furnished with radial dynamic-pressure bearings. The fluid guide members may be arranged to fit along the flat plate-shaped members in any storage device or recording device, but wherein there are a plurality of flat plate-shaped members, there do not necessarily have to be fluid guide members adjacent all of them. The fluid guide members may be arranged, for example, at only the axially uppermost and axially lowermost flat plate-shaped members, arranged according to size of the radial load in the radial dynamic-pressure bearing, or arranged on only one flank of the flat plate-shaped members. Thus various ways of establishing the presence/absence of the fluid guide members, or their form and distributional position are possible.

Again, as to distributional positions for the fluid guide members, in instances such as with CD-ROMs as removably installable type recording media the fluid guide members should be in a position such that they do not to interfere with the disk installing/removing operation. Or they may be made so as to be movable-type fluid guide members such that they retract momentarily from the recording medium insertion path.

Further, in the case of the above-described HDD the outer peripheral surface of the hub 24 is shaped as a constant-diameter cylinder, but the rotary main is not thus limited: in some instances the outer peripheral surface is beveled to be a locating guide when fitting on the recording medium, as in the case of removably installable type recording media such as CD-ROMs.

Further, the foregoing spindle motor is furnished with fixed-shaft type bearing means in which the shaft element (stationary shaft 22) is fixed, but the motor may be such that rotary-shaft type bearing means that are of the opposite configuration are provided. In other words, "rotary-shaft type bearing means" is a configuration in which a sleeve member that forms a part of a stationary section supports a shaft that forms a part of the rotor.

The laterals walls 10a2 of the casing body 10a are cylindrical faces shaped to encompass and match the form of the disks 12, but it makes no difference if they are plane faces. The bottom wall 10a1 or the ceiling plate 20 are flat surfaces, but the air-current guide plates 32 adjoining them may be unitized therewith, and these regions only may be made in protruding or recessed shapes.

It should be understood that the top/bottom positional relationships in the foregoing description of the embodiments are established tentatively for the convenience of explanation, but do not limit the conditions of actual use.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A rotary device comprising:

a stationary section;

a rotary section surrounded by part of the stationary section and including a rotary main member allowed to rotate with respect to the stationary section and having an outer peripheral surface, and at least one coaxial flat plate-shaped member projecting diametrically from the outer peripheral surface;

bearing means including at least a radial dynamic-pressure bearing portion provided intervening between the stationary section and the rotary section, for rotatively supporting the rotary section against the stationary section; and at least one ambient-gaseous fluid guide member disposed on the rotary-section-surrounding part of the stationary section, wherein the fluid guide member is external to the bearing means, and proximate a predetermined region of at least one of respective axial upper and lower faces of the flat plate-shaped member, the fluid guide member having a guide face heading from a predetermined outward portion separated diametrically outward from the outer peripheral surface of the rotary main member and approaching diametrically inward toward an inward portion thereof heading along downstream-ward in the rotational direction of the rotary section, for concentrating ambient gaseous fluid, external to said bearing means and traveling with rotation of the flat plate-shaped member, diametrically inward toward a predetermined position circumferentially on said outer peripheral surface of the rotary main member and applying pressure diametrically with respect to the rotary main member.

2. A rotary device furnished with a radial dynamic-pressure bearing portion as set forth in claim 1, wherein:

setting the rotary device on its side biases the rotary section under gravity to be eccentric in a constant direction in a state in which pressure is not applied to the rotary main member by said fluid guide member; and said fluid guide member is characterized in that pressure gained on said rotary main member by the fluid guide member is in a direction not coincident with the constant direction in which the rotary section is eccentrically biased under gravity.

3. A rotary device furnished with radial dynamic-pressure bearing portion as set forth in claim 1, characterized in being provided in a substantially airtight space.

4. A rotary device furnished with radial dynamic-pressure bearing portion as set forth in claim 1, wherein the coaxial flat plate-shaped member is a storage disk.

5. A rotary device furnished with radial dynamic-pressure bearing portion as set forth in claim 4, wherein:

the rotary section comprises a plurality of storage disks; and fluid guide members constituting a plurality are disposed over and between adjacent storage disks.

6. A storage device comprising:

a stationary section;

a rotary section surrounded by part of the stationary section and including a rotary main member allowed to rotate with respect to the stationary section and having an outer peripheral surface, and at least one coaxial disk-shaped recording medium projecting diametrically from the outer peripheral surface;

bearing means including at least a radial dynamic-pressure bearing portion provided intervening between the stationary section and the rotary section, for rotatively supporting the rotary section against the stationary section; and at least one ambient gaseous fluid guide member disposed on the rotary-section-surrounding part of the stationary section, wherein the fluid guide member is external to the bearing means, and proximate a predetermined region of at least one of respective axial upper and lower faces of the disk-shaped recording medium, the fluid guide member having a guide face heading from a predetermined outward portion separated diametrically outward from the outer peripheral surface of the rotary main member and approaching diametrically inward toward an inward portion thereof heading along downstream-ward in the rotational direction of the rotary section, for concentrating ambient gaseous fluid, external to said bearing means and traveling with rotation of said recording medium, diametrically inward toward a predetermined position circumferentially on said outer peripheral surface of the rotary main member and applying pressure diametrically with respect to the rotary main member.

7. A storage device as set forth in claim 6, wherein:

setting the storage device on its side biases the rotary section under gravity to be eccentric in a constant direction in a state in which pressure is not applied to the rotary main member by said fluid guide member; and said fluid guide member is characterized in that pressure gained on said rotary main member by the fluid guide member is in a direction not coincident with the constant direction in which the rotary section is eccentrically biased under gravity.

8. A storage device as set forth in claim 6, characterized in being provided in a substantially airtight space.

9. A storage device as set forth in claim 6, characterized in that:

a read/write head for carrying out reading/writing on said storage medium is furnished on said stationary section; and said fluid guide member is provided in a position not interfering with read/write operations of said read/write head.

10. A storage device as set forth in claim 6, wherein the disk-shaped recording medium is a storage disk.

11. A rotary device furnished with radial dynamic-pressure bearing portion as set forth in claim 10, wherein:

the rotary section comprises a plurality of storage disks; and fluid guide members constituting a plurality are disposed over and between adjacent storage disks.

12. An electric motor comprising:

a stationary section having an axially extending support portion;

a rotary section including an axially extending rotary main member disposed axially coextensive with the support portion of and configured to rotate with respect to the stationary section, the rotary main member outer-circumferentially being radially opposed by a part of the stationary section surrounding the rotary section to define an ambient space external thereto;

fluid dynamic-pressure bearing means including at least a radial dynamic-pressure bearing portion provided intervening between the rotary main member and the support portion of the stationary section, for rotatively supporting the rotary section against the stationary section; and one or more ambient-gaseous fluid guide members provided on a predetermined region of the part of the stationary section surrounding the rotary section, and having a guide face heading from a predetermined outward portion separated diametrically outward from the outer peripheral surface of the rotary main member and approaching diametrically inward toward an inward portion thereof heading along downstreamward in the rotational direction of the rotary section, for concentrating ambient gaseous fluid, external to said bearing means and traveling with rotation of the rotary section, radially inward toward a predetermined position outer-circumferentially along the rotary main member to apply radially directed pressure against the rotary main member.

13. The electric motor as set forth in claim 12, wherein:

setting the motor on its side biases the rotary section under gravity to be eccentric in a constant direction in a state in which pressure is not applied to the rotary main member by the fluid guide member; and the one or more fluid guide members are configured such that pressure gained on the rotary main member by the fluid guide member is in a direction not coincident with the constant direction in which the rotary section is eccentrically biased under gravity.

14. The electric motor as set forth in claim 12, wherein the stationary section is configured such that the ambient space is substantially airtight.

15. The electric motor as set forth in claim 12, wherein the rotary section further includes one or more data storage disks carried on the rotary main member.

16. The electric motor as set forth in claim 15, wherein:

the rotary section includes a plurality of the storage disks; and a plurality of the fluid guide members is disposed flanking and between adjacent storage disks.

17. A spindle motor comprising:

a casing;

a stationary cylindrical support member extending axially from a base wall of the casing;

a rotor having a cylindrical rotary member disposed in axial coextension with the cylindrical support member, wherein the rotary member and the cylindrical support member are nested to oppose via a radial micro-gap, and the casing surrounds the rotor to define an ambient space external thereto;

fluid dynamic-pressure bearing means for rotatively supporting the rotor with respect to the support member, the bearing means including at least a radial dynamic-pressure bearing portion established in the micro-gap between the rotary member and the cylindrical support member; and one or more ambient gaseous fluid guide members provided radially projecting, from a predetermined region of a wall of the casing surrounding the rotor, in an arcuate line extending forward in the rotary-member rotational direction into a predetermined position proximate the rotor with respect to its cylindrical surface and having a guide surface extending along the arcuate line and projecting axially inward, for concentrating ambient gaseous fluid, flowing by rotation of the rotor, onto a line passing through the predetermined position and parallel to the rotor rotational axis, to apply radially directed pressure against the rotor and offset the rotor relative to the stationary cylindrical support member in the direction of the radially directed pressure.

18. The spindle motor as set forth in claim 17, wherein:

setting the motor on its side biases the rotor under gravity to be eccentric in a constant direction in a state in which pressure is not applied to the rotary main member by the fluid guide member; and the one or more fluid guide members are configured such that pressure gained on the cylindrical rotary member by the fluid guide member is in a direction not coincident with the constant direction in which the rotor is eccentrically biased under gravity.

19. The spindle motor as set forth in claim 17, wherein the casing is substantially airtight.

20. The spindle motor as set forth in claim 17, wherein the rotor includes one or more data storage disks carried on the cylindrical rotary member.

21. The spindle motor as set forth in claim 20, wherein:

the rotor includes a plurality of the storage disks; and a plurality of the fluid guide members is disposed flanking and between adjacent storage disks.

22. The spindle motor as set forth in claim 17, wherein:

a data read/write head is furnished in the casing adjacent each of the one or more storage disks; and the one or more fluid guide members are provided in a position not to interfere with data read/write operations of the read/write head.

* * * * *